United States Patent
Garcia-Martinez et al.

(10) Patent No.: US 10,325,305 B2
(45) Date of Patent: Jun. 18, 2019

(54) CUSTOMIZING CONTENT DELIVERY FROM A BRAND PAGE TO A USER IN A SOCIAL NETWORKING ENVIRONMENT

(71) Applicant: Facebook, Inc., Menlo Park, CA (US)

(72) Inventors: Antonio Felipe Garcia-Martinez, Alameda, CA (US); Nipun Mathur, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 386 days.

(21) Appl. No.: 14/882,023

(22) Filed: Oct. 13, 2015

(65) Prior Publication Data
US 2016/0035004 A1 Feb. 4, 2016

Related U.S. Application Data

(63) Continuation of application No. 13/627,857, filed on Sep. 26, 2012, now Pat. No. 9,195,632.
(Continued)

(51) Int. Cl.
*G06Q 30/06* (2012.01)
*G06F 16/00* (2019.01)
(Continued)

(52) U.S. Cl.
CPC ......... *G06Q 30/0631* (2013.01); *G06F 16/00* (2019.01); *G06F 16/9535* (2019.01); *G06F 17/00* (2013.01); *G06Q 50/01* (2013.01)

(58) Field of Classification Search
CPC .... G06F 17/00; G06F 17/30; G06F 17/30867; G06Q 30/0631; G06Q 50/01
(Continued)

(56) References Cited

U.S. PATENT DOCUMENTS

| | | | |
|---|---|---|---|
| 6,286,043 B1 * | 9/2001 | Cuomo | H04L 67/30 709/217 |
| 6,519,571 B1 | 2/2003 | Guheen et al. | |

(Continued)

FOREIGN PATENT DOCUMENTS

| | | |
|---|---|---|
| CN | 101849229 A | 9/2010 |
| JP | 2008269286 A | 11/2008 |

(Continued)

OTHER PUBLICATIONS

Japan Patent Office, Office Action, Japanese Patent Application No. 2015-523242, dated Apr. 18, 2017, eleven pages.
(Continued)

*Primary Examiner* — Andrew R Dyer
(74) *Attorney, Agent, or Firm* — Fenwick & West LLP

(57) ABSTRACT

A social networking system user's interaction with a brand page may be tailored to match the user's interests. Content providers or page administrators of a brand page associate keywords with content posted to the brand page. A keyword may define a characteristic of a social networking system user to receive the content or may describe a characteristic of the content. The keywords are compared to a user profile of a user requesting the brand page and content posted to the brand page is selected for presentation to the user based on the user profile and the keywords. For example, content is presented to a user having a characteristic defined by criteria keyword. The selected content posted to the brand page is presented to the user requesting the brand page.

20 Claims, 5 Drawing Sheets

Related U.S. Application Data

(60) Provisional application No. 61/632,428, filed on Jul. 19, 2012.

(51) Int. Cl.
*G06F 17/00* (2019.01)
*G06F 16/9535* (2019.01)
*G06Q 50/00* (2012.01)

(58) Field of Classification Search
USPC ..... 715/234; 705/14.49, 14.53, 14.66, 14.67, 705/14.73
See application file for complete search history.

(56) References Cited

U.S. PATENT DOCUMENTS

| | | | |
|---|---|---|---|
| 6,606,744 B1 | 8/2003 | Mikurak | |
| 6,850,975 B1* | 2/2005 | Danneels | G06F 17/3089 707/E17.116 |
| 7,499,948 B2* | 3/2009 | Smith | G06Q 30/02 |
| 8,375,305 B1* | 2/2013 | Strand | G06F 3/048 715/234 |
| 8,396,813 B2 | 3/2013 | Gaucas et al. | |
| 8,402,054 B2 | 3/2013 | Frazier | |
| 8,887,085 B1* | 11/2014 | Cox | G06F 3/04855 715/786 |
| 2007/0112792 A1 | 5/2007 | Majumder | |
| 2007/0250467 A1* | 10/2007 | Mesnik | G06F 17/3089 |
| 2008/0033776 A1 | 2/2008 | Marchese | |
| 2008/0090513 A1 | 4/2008 | Collins et al. | |
| 2008/0281794 A1* | 11/2008 | Mathur | G06F 17/3089 |
| 2009/0119167 A1 | 5/2009 | Kendall et al. | |
| 2009/0192871 A1* | 7/2009 | Deacon | G06Q 10/00 705/319 |
| 2009/0222348 A1 | 9/2009 | Ransom et al. | |
| 2009/0276453 A1 | 11/2009 | Trout et al. | |
| 2009/0276459 A1 | 11/2009 | Trout et al. | |
| 2009/0319908 A1 | 12/2009 | Hummel et al. | |
| 2010/0205057 A1 | 8/2010 | Hook et al. | |
| 2010/0250341 A1* | 9/2010 | Hauser | G06F 17/30867 707/769 |
| 2011/0145064 A1 | 6/2011 | Anderson et al. | |
| 2011/0191417 A1 | 8/2011 | Rathod | |
| 2011/0225293 A1* | 9/2011 | Rathod | G06F 17/30867 709/224 |
| 2012/0185486 A1 | 7/2012 | Voigt et al. | |
| 2012/0254149 A1* | 10/2012 | Ramsay | G06Q 30/0256 707/709 |
| 2013/0013404 A1 | 1/2013 | Suprock et al. | |
| 2013/0268373 A1 | 10/2013 | Grishaver | |

FOREIGN PATENT DOCUMENTS

| | | |
|---|---|---|
| JP | 2011-503701 A | 1/2011 |
| JP | 2011192246 A | 9/2011 |
| KR | 10-2001-0047541 A | 6/2001 |
| KR | 20020025341 A | 4/2002 |
| KR | 20090007060 A | 1/2009 |
| KR | 10-20110003550 A | 1/2011 |
| KR | 20120033560 A | 4/2012 |
| WO | WO 2009/061616 A1 | 5/2009 |
| WO | WO 2011/011398 A2 | 1/2011 |
| WO | WO 2011/051023 A1 | 5/2011 |

OTHER PUBLICATIONS

Livedoor News, "Hot Link Inc. Recommendation Services to Auto Recommend Products or Services over Facebook Pages," *Livedoor News*, Apr. 11, 2011, two pages. [Online] [Retrieved Apr. 4, 2017] Retrieved from the Internet <URL:http://news.livedoor.com/article/detail/5483573> [with summary in English].

Sakamoto, H. et al., "How to Use Facebook 100 Times Effectively," Apr. 4, 2011, four pages, Aspect Co. Ltd. [with summary in English].

Australian Government, IP Australia, Examination report No. 4 for standard patent application, Australian Patent Application No. 2013292546, dated Sep. 29, 2017, three pages.

Japan Patent Office, Office Action, Japanese Patent Application No. 2015-523242, dated Oct. 17, 2017, nine pages.

Korean Intellectual Property Office, Office Action, Application No. 10-2015-7002915, dated Sep. 19, 2017, seven pages.

Australian Government, IP Australia, Examination report No. 3 for standard patent application, Australian Patent Application No. 2013292546, dated Jun. 6, 2017, four pages.

Australian Government, IP Australia, Patent Examination Report No. 1, Australian Patent Application No. 2013292546, dated Nov. 5, 2016, four pages.

European Patent Office, Examination Report, European Patent Application No. 13176956.4, dated Jan. 27, 2017, eleven pages.

Australian Government, IP Australia, Examination report No. 2 for standard patent application, Australian Patent Examination No. 2013292546, dated Feb. 23, 2017, six pages.

Korean Intellectual Property Office, Office Action, Korean Patent Application No. 10-2015-7002915, dated Mar. 28, 2017, twenty-eight pages.

Mexican Institute of Industrial Property, Division of Patents, Mexican Patent Application No. MX/a/2015/000793, Jan. 31, 2017, three pages [with summary in English].

State Intellectual Property Office of the People's Republic of China, First Office Action, Chinese Patent Application No. 2013800385243, dated Jan. 18, 2017, thirty pages.

European Patent Office, European Search Report and Opinion, European Patent Application No. 13176956.4, dated Sep. 27, 2013, seven pages.

PCT International Search Report and Written Opinion, PCT Application No. PCT/US2013/051012, dated Oct 28, 2013, sixteen pages.

Canadian Intellectual Property Office, Office Action, Canadian Patent Application No. 2,878,068, dated Jan. 20, 2016, three pages.

Office Action for U.S. Appl. No. 13/627,857 dated Mar. 31, 2015, twenty-two pages.

Office Action for U.S. Appl. No. 13/627,857 dated Nov. 28, 2014, eighteen pages.

Taiwan Intellectual Property Office, Office Action, Taiwanese Patent Application No. 102125589, dated Jun. 27, 2016, seventeen pages.

Canadian Intellectual Property Office, Office Action, Canadian Patent Application No. 2,956,750, dated Jan. 26, 2018, three pages.

European Patent Office, Summons to attend oral proceedings pursuant to Rule 115(1) EPC, European Patent Application No. 13176956.4, Dec. 11, 2017, eleven pages.

Korea Intellectual Property Office, Office Action, Korean Patent Application No. 10-2015-7002915, dated Nov. 24, 2017, six pages.

Australian Government, IP Australia, Examination report No. 1 for standard patent application, Australian Patent Application No. 2017254843, dated Jun. 28, 2018, four pages.

Taiwan Intellectual Property Office, Office Action, Taiwanese Patent Application No. 106105829, dated May 24, 2018, seventeen pages.

* cited by examiner

CUSTOMIZING CONTENT DELIVERY FROM A BRAND PAGE TO A USER IN A SOCIAL NETWORKING ENVIRONMENT

CROSS REFERENCE TO RELATED APPLICATIONS

This application is a continuation of U.S. application Ser. No. 13/627,857, filed on Sep. 26, 2012, which claims the benefit of U.S. Provisional Application No. 61/632,428, filed on Jul. 19, 2012, each of which is incorporated by reference in its entirety.

BACKGROUND

Embodiments of the present disclosure relate generally to social networking and, more specifically, to personalized distribution of content items to users of a social networking system.

Social networks, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network. This information can then be used to target information delivery so that information more likely to be of particular interest to a user can be communicated to that user.

While social networking systems allow people to exchange information with each other, they also allow entities to provide information to users of the social networking system. Examples of entities include businesses, organizations and celebrities. An entity may create a brand page, which is associated with a profile, within the social networking system and post content items to the brand page. The social networking system then communicates the posted content item or a description of the posted content item to social networking system users connected to the brand page. Hence, the brand page allows the entity to act as any other user of the social networking system and disseminate information to social networking system users.

However, various types of entities have audiences composed of segments, wherein each segment has a particular interest in the entity. In the social networking context, different social networking system users may have different levels of interest in different content posted to the brand page. For example, users connected to a brand page associated with a sporting goods supplier have varying degrees of interest in posts on the brand page about products for different sports. Conventionally, users connected to a brand page are notified of content posted to the brand page without accounting for differing levels of interest in different content posted to the brand page.

SUMMARY

To better customize interaction between a brand page that is associated with an entity and stored on a social networking system, one or more attributes of content posted to the brand page are used in conjunction with characteristics in a social networking system user's user profile to select the content presented to the user when the brand page is accessed. For example, content posted to the brand page is associated with targeting criteria defining at least one characteristic of a user of the social networking system. The targeting criteria are used to direct content to users of the social networking system for whom the content posted to the brand page is of particular interest. In one embodiment, user profiles of social networking system users to whom the brand page is connected are accessed and used to determine whether a viewing user to whom the brand page is connected has the at least one characteristic defined by the targeting criteria. If the viewing user to whom the brand page is connected has the characteristic, the content posted to the brand page corresponding to the at least one characteristic is presented to the viewing user.

As another example, a user's affinity for different content posted to the brand page by an administrator so that the brand page includes content for which the user has a threshold affinity or has highest affinity when viewed by the user. A brand page administrator may associate keywords with content posted to the brand page describing the content. Based on a user's user profile and/or connections to objects in the social networking system, the user's affinities for keywords associated with different content is determined. Based on the affinities, content is selected for inclusion on the brand page, so that the content is more likely to be of interest to the user.

For example, a page administrator for a brand page associated with a sporting goods supplier posts a story about a tennis clinic to the brand page and associates the story a keyword of "tennis." A user profile, or an action log, of a social networking system user connected to the brand page may be accessed and used to determine whether the user has an interest for "tennis." For example, the user has an affinity for "tennis" if "tennis" is listed as an interest in the user profile or if other information associated with the user profile indicates the user has at least a threshold affinity for "tennis." If the user has an interest in "tennis," the content posted to the brand page associated with a keyword of "tennis" is presented to the user. However, if the user does not have an interest in "tennis," content posted to the brand page associated with "tennis" is not presented to the user when the brand page is accessed. Hence, associating keywords or other characteristics with content posted to a brand page allows the brand page to be customized for different users based on the users' affinity for the keywords or characteristics.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
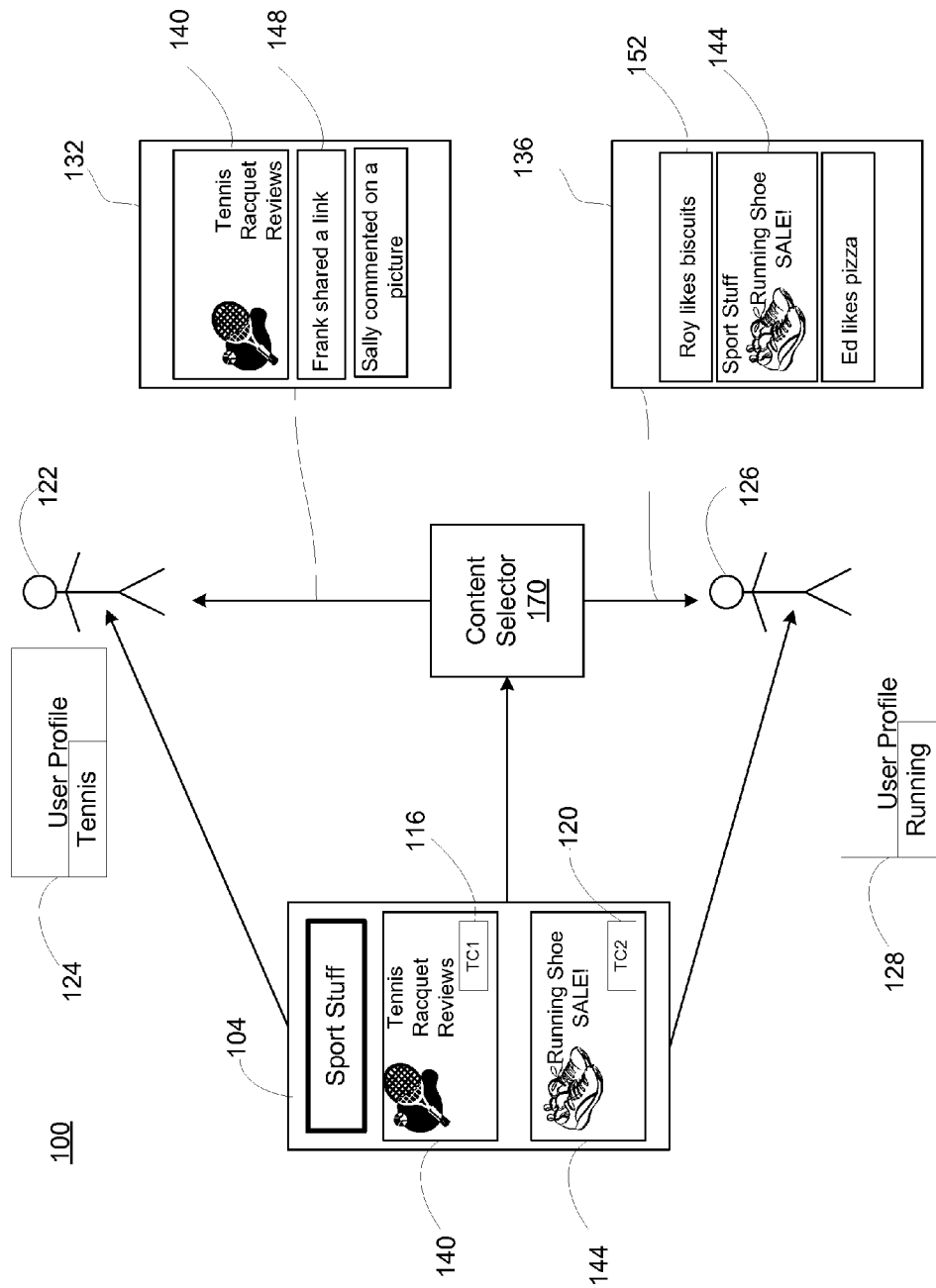
FIG. 1 is an event diagram illustrating a process for selecting content to provide on a display to a user, in accordance with an embodiment of the invention.

FIG. 1 shows an example of selecting content posted to a brand page for presentation to social networking system users. In FIG. 1, a first content item 140 and a second content item 144 are posted to a brand page 104, which is stored by a social networking system 100. An entity may generate and maintain the brand page 104 to post information about itself, about its products or to provide other information to users of the social networking system 100. Examples of content an entity may post to the brand page 104 include: stories about services or products offered by the entity, pictures of the entity, pictures of products and/or services offered by the entity, new product introductions, product sales, stories of products in use, promotional offers for products or services, articles and/or reviews describing a product or service offered by the entity or other suitable information. In FIG. 1, a first content item 140 and a second content item 144 are depicted as posted to the brand page 104. The first content item 140 and the second content item 144 may be presented to social networking users viewing the brand page 104 in a variety of ways. For example, the content items 140, 144 are displayed on the brand page 104, are included in a news feed story sent to users connected to the brand page 104, are transmitted as one or more messages to users connected to the brand page 104 or are distributed using any suitable channel.

Social networking system users may connect to the brand page 104 to be updated when content items are posted to the brand page 104, to receive updates about the entity or other suitable information. For example, social networking system users may become friends with the brand page, follow the brand page, become a fan of the brand page or otherwise establish a connection with the brand page and/or its associated entity in the social networking system 100. Hence, the brand page 104 allows the entity to provide information about itself or its products and/or services to social networking system users to promote a relationship between the entity and social networking system users.

For purposes of illustration, the brand page 104 in FIG. 1 is associated with a sporting goods supplier, with the first content item 140 describing tennis racquets stocked by the sporting goods supplier and the second content item 144 describing running shoes sold by the sporting goods supplier. The first content item 140 is associated with a first keyword 116 and the second content item 144 is associated with a second keyword 120. Keywords associated with a content item describe characteristics of the content item, such as the subject matter of the content item, a product associated with the content item, an entity associated with the content item, an author of the content item or other suitable characteristic associated with a content item. In one embodiment, one or more of the keywords associated with a content item may be targeting criteria. Targeting criteria define one or more characteristics of a social networking system user to whom the entity desires to present a content item. For example, targeting criteria identifies one or more interests included a user profile (e.g., demographic information, affiliations with groups of the social networking system or other characteristics), as well as characteristics inferred from user actions taken on or off the social networking system. Additional examples of targeting criteria include a location, an action, an event, a type of connection to a user or entity, an entity, a user, an employer, an educational institution, an affinity or other suitable information.

In FIG. 1, the first keyword 116 identifies a characteristic of "tennis" for the first content item 140 while the second keyword 120 identifies a characteristic of "running" For the second content item 144. When a user accesses the brand page 104, information associated with the user and the keywords associated with content items included on the brand page are used to select content items presented to the user by the brand page 104. If a keyword is targeting criteria, information in a user profile is compared to the keyword to determine whether the user satisfies the targeting criteria. For example, a user is determined to have the characteristic identified by the first keyword 120 if a user profile includes "tennis" as an interest. While FIG. 1 shows a single keyword associated with different content items, in other embodiments, any number of keywords may be associated with content items. As another example, the affinities of a user for keywords are calculated, and content items associated with keywords with which the user has the highest affinity or at least a threshold affinity are selected for inclusion on the brand page 104. In one embodiment, the keywords 116, 120 are defined by the entity, which also associates the keywords 116, 120 with one or more content items 140, 144. As shown in FIG. 1, different content items 140, 144 posted to the brand page 104 may be associated with different keywords 116, 120.

In conventional social networking systems, users connected to a brand page 104 are presented with each content item 140, 144 posted to a brand page 140. For example, a conventional brand page 104 sends the first content item 140 and the second content item 144 to a user. So, a user connected to the brand page 104 with no interest in running would be presented the running-focused second content item 144 as well as other content items from the brand page 104. Because different users connected to the brand page 104 have different interests, this may result in a user manually sifting through content items from the brand page 104 to identify content items of interest to the user.

By associating keywords 116, 120 with content items 140, 144, an entity improves interaction between social networking system users and the brand page 104. Keywords 116, 120 allows the entity to associate content items with one or more characteristics of users to whom the entity desires a content item to be presented or to associated content items with characteristics with which a user may have an affinity. In one embodiment, keywords 116, 120 identify information in a user profile of the social networking system identifying a characteristic of a user that the entity desires to receive a content item. For example, keywords 116, 120 associated with a content item 140, 144 allows an entity to direct a content item 140, 144 to users having one or more characteristics specified by the keywords 116, 120. Alternatively, keywords 116, 120 identify topics or entities with which a user may have an affinity or preference. Hence, the keywords 116, 120 allow an entity to better customize content from a brand page 104 to social networking system users.

FIG. 1 illustrates use of keywords 116, 120 to customize content items provided by a brand page 104 to social networking system users. In FIG. 1, a first user 122 and a second user 126 are connected to the brand page 104. The social networking system 100 also includes a first user profile 124 for the first user 122 and a second user profile 128 for the second user 126. FIG. 1 shows the first user profile 124 having a stored interest of "tennis" and the second user profile 128 having a stored interest of "running" However, the user profiles 124, 128 may also include additional information about the first and second users 122, 126.

In FIG. 1, the social networking system 100 includes a content selector 170, which receives the keywords 116, 120 from the brand page 104 and retrieves data from the first user profile 124 and from the second user profile 124 to select content items for presentation to the first user 122 and to the second user 126 via the brand page 104. The content selector 170 compares user profile information for users connected to the brand page 104 to the keywords 116, 120. In one embodiment, the content selector 170 also receives a content identifier from the brand page 104 identifying the content item associated with keywords 116, 120. The content selector 170 then delivers a content item to users connected to the brand page 104 that have user profile information matching one or more keywords or that have at least a threshold affinity for a keyword. In the example of FIG. 1, the content selector 170 delivers the first content item 140 to the first user 122, because the first user profile 124 identifies "tennis" as an interest of the first user 122, matching the first keyword 116. Similarly, the content selector 170 delivers the second content item 144 to the second user 126, as the second user profile 128 identifies "running" as a interest of the second user 126, which matches the second keyword 120.

The example of FIG. 1 also illustrates customization of content displayed to the first user 122 and to the second user 126. For purposes of illustration, FIG. 1 shows a first news feed 132 delivered to the first user 122 and a second news feed delivered to the second user 126. However, in various embodiments content may be delivered to the first user 122 and to the second user 126 in a variety of ways, such as via messages to the users 122, 126, modification of the brand page 104 appearance when accessed by the users 122, 126 or any other suitable distribution mechanism.

In FIG. 1, the first user 122 has an interest in "tennis," which matches the first keyword 116. Hence, the first content item 140 is included in the first news feed 132 in addition to additional stories 148, which may describe actions taken by other social networking users connected to the first user 122. As shown in FIG. 1, the first news feed 132 does not include the second content item 120 because the first user 122 does not have an interest in "running," as specified by the second keyword 120. In other embodiments, the first news feed 132 may also include the second content item 120 in a less-prominent location than the first content item 140. For example, the first content item 140 is positioned at the top of the first news feed 132 or is otherwise visually distinguished from the second content item 144.

Similarly, the second news feed 136 in FIG. 1 includes the second content item 144 because the second user 126 has an interest in "running," as specified by the second keyword 120. The second news feed 136 also includes additional stories 152 describing actions of other users connected to the second user 126. In various embodiments, the second news feed 126 may visually distinguish the second content item 144 from the additional stories 152.

Hence, FIG. 1 shows use of keywords 116, 120 to customize the content items from a brand page 104 appearing in news feeds for different users. In other embodiments, the targeting criteria 116, 120 allow additional types of customization, such as customizing the appearance of the brand page 104 when accessed by different users 122, 126 or customizing messages about content sent from the brand page 104 to different users 122, 126.

System Architecture

Figure 2:
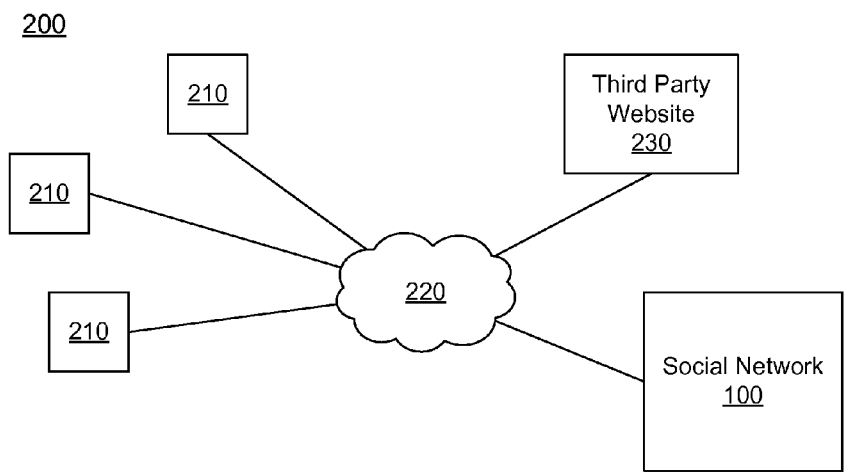
FIG. 2 is a network diagram of a system for providing content items to users of a social networking system, in accordance with an embodiment of the invention.

FIG. 2 is a high level block diagram illustrating a system environment 200 for a social networking system 100. The system environment 200 comprises one or more client devices 210, a network 220, one or more third-party websites 230 and the social networking system 100. In alternative configurations, different and/or additional components may be included in the system environment 200. The embodiments described herein can be adapted to online systems that are not social networking systems.

The client devices 210 comprise one or more computing devices capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smart-phone or similar device. A client device 210 is configured to communicate via the network 220. In one embodiment, a client device 210 executes an application allowing a user of the client device 210 to interact with the social networking system 100. For example, a client device 210 executes a browser application to enable interaction between the client device 210 and the social networking system 100 via the network 220. In another embodiment, a client device 210 interacts with the social networking system 100 through an application programming interface (API) that runs on the native operating system of the client device 210, such as IOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 230 may be coupled to the network 220 for communicating with the social networking system 100, which is further described below in conjunction with FIG. 3.

Figure 3:
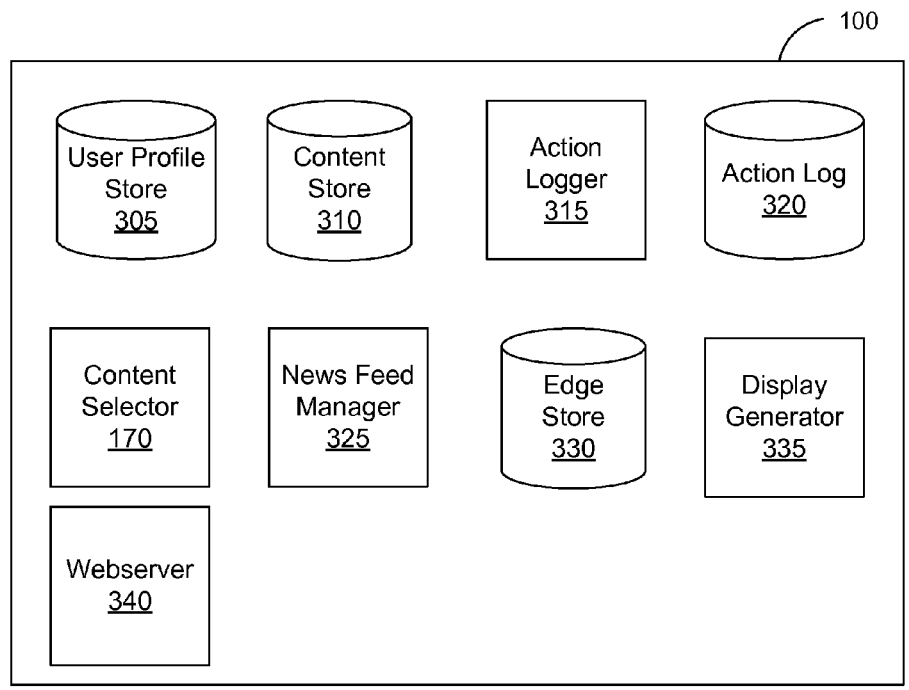
FIG. 3 is a block diagram of a social networking system, in accordance with an embodiment of the invention.

FIG. 3 is an example block diagram of one embodiment of a system architecture of the social networking system 100. The social networking system 100 includes a user profile store 305, a content store 310, an action logger 315, an action log 320, a content selector 170, a newsfeed manager 325, an edge store 330, a display generator 335, and a web server 340. In other embodiments, the social networking system 100 may include additional, fewer, or different modules for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 305. A user profile includes declarative information about the user that was explicitly shared by the user, and may also include profile information inferred by the social networking system 100. In one embodiment, a user profile includes multiple data fields, each data field describing one or more attributes of the corresponding user of the social networking system 100. The user profile information stored in user profile store 305 describes the users of the social networking system 100, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 100 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

Content store 310 stores content items associated with a user profile, such as images, videos and audio files. Content items from the content store 310 may be displayed when a profile page for a user is viewed, when a brand page is viewed or when other content is viewed. For example, displayed content items may show images or video associated with a user profile or show text describing a user's status. These content items may be presented to the user in a variety of communication channels. Examples of communication channels include the brand page, a news feed including content items from users or entities, e-mails, text messaging, notifications sent by the social networking system 100, a push notification channel sending content items to devices associated with a user, or other suitable communication channels.

Additionally, other content items may facilitate user engagement by encouraging a user to expand his connections to other users, to invite new users to the system or to increase interaction with the social networking system 100 by displaying content related to users, objects, activities, or functionalities of the social networking system 100. Examples of social networking content items include suggested connections or suggestions to perform other actions, media provided to, or maintained by, the social networking system 100 (e.g., pictures or videos), status messages or links posted by users to the social networking system, invitations, events, items in a user's wish-list, groups, pages (e.g., representing an organization or commercial entity), deals, coupons, and any other content provided by or accessible via the social networking system.

The content store 310 also includes one or more brand pages associated with user profiles of entities. A brand page comprises content associated with the entity and instructions for presenting the content to a social networking system user. For example, a brand page identifies content associated with the entity's user profile as well as information describing how to present the content to users viewing the brand page. The content item store 310 may also store one or more keywords associated with each content item in the content store 310. The keywords may be targeting criteria identifying one or more characteristics of a user to whom a content item is to be delivered. Alternatively, the keywords may identify topics or characteristics associated with content, allowing determination of user's affinity for one or more of the keywords to represent the likelihood of the user having an interest in the content.

The action logger 315 receives communications about user actions on and/or off the social networking system 100, populating the action log 320 with information about user actions. Such actions may include, for example, adding a connection to another user, sending a message to another user, uploading an image, reading a message from another user, viewing content associated with another user, attending an event posted by another user, among others. In some embodiments, the action logger 315 identifies interaction between a social networking system user and a brand page within the social networking system 100, which communicates targeting criteria associated with content on the brand page to the content selector 170 to customize content presented via a brand page. In addition, a number of actions described in connection with other objects are directed at particular users, so these actions are associated with those users as well. These actions are stored in the action log 320.

The action log 320 may be used by the social networking system 100 to track user actions on the social networking system 100, as well as external website that communicate information to the social networking system 100. Users may interact with various objects on the social networking system 100, including commenting on posts, sharing links, and checking-in to physical locations via a mobile device, accessing content items in a sequence or other interactions. Information describing these actions is stored in the action log 320. Additional examples of interactions with objects on the social networking system 100 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 100 as well as other applications operating on the social networking system 100. In some embodiments, data from the action log 320 is used to infer interests or preferences of the user, augmenting the interests included in the user profile and allowing a more complete understanding of user preferences.

The action log 320 may also store user actions taken on external websites. For example, an e-commerce website that primarily sells sporting equipment at bargain prices may recognize a user of a social networking system 100 through social plug-ins that enable the e-commerce website to identify the user of the social networking system 100. Because users of the social networking system 100 are uniquely identifiable, e-commerce websites, such as this sporting equipment retailer, may use the information about these users as they visit their websites. The action log 320 records data about these users, including webpage viewing histories, advertisements that were engaged, purchases made, and other patterns from shopping and buying.

A news feed manager 325 selectively provides content to users of a social networking system 100 and records the consumption of content by users. In one embodiment, the news feed manager 325 generates stories for a user describing actions taken by other users of the social networking system 100 to whom the user is connected. In one example, the newsfeed generated by the news feed manager 325 for a user includes comments made by other users to whom the user is connected. In another example, the newsfeed generated includes content posted to the social network system 240 by other users of the social networking system to whom the user is connected or other actions taken by other users to whom the user is connected. New news feed stories generated for a user by the news feed manager may be ranked and stored by the social networking system 100. The news feed manager 325 may communicate with client devices 210 through the network 220 to provide content to users of the social networking system 100.

In one embodiment, a news feed manager 325 may provide content through a social plug-in, such as an iframe, to a third party website 230 to provide content posted on the social networking system 100 about an entity associated with the third party website 230. As an example, a business entity creating a brand page on the social networking system 100 may desire to publish content items posted on the brand page's news feed in the social networking system 100 to a third party website 230 via a social plug-in installed on the third party website 230. Hence, content items posted to a brand page may be communicated to users connected to the brand page using a variety of techniques. The content items may be included in a news feed presented to the user within a domain of the social networking system or within a different domain, such as a domain associated with the third party website 230. In addition, the news feed manager 325 may distribute content items associated with a brand page to users via a push channel communicating the content items to an application operating on one or more client devices 210.

In one embodiment, an edge store 330 stores the information describing connections between users and other objects on the social networking system 100 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system, sharing a link with other users of the social networking system, and commenting on posts made by other users of the social networking system.

The edge store 330 stores edge objects that include information about the edge, such as affinity scores for objects, interests, and other users. Affinity scores, or affinities, may be computed by the social networking system 100 over time to approximate a user's affinity for an object, interest, and other users in the social networking system 100 based on the actions performed by the user. Examples of actions used to calculate a user's affinity for another user, brand page or keyword include: the user commenting on a photo associated with a keyword or another user, the user expressing a preference for content on a brand page or on a user profile, the user posting content to a brand page or to a user profile, the frequency of interaction between the user and the brand page or with content associated with a keyword, the user sharing content associated with a keyword or another user, the user subscribing to content associated with a user or with a keyword, or any other suitable action. Calculation of affinity scores is further described in U.S. patent application Ser. No. 12/978,265, filed Dec. 23, 2010, which is hereby incorporated by reference in its entirety, describes various systems for predicting a user's affinity for content in a social networking system. Multiple interactions between a user and a specific object may be stored in one edge object in the edge store 330, in one embodiment. In some embodiments, connections between users may be stored in the user profile store 310, or the user profile store 310 may access the edge store 330 to determine connections between users.

The web server 340 links the social networking system 100 via the network 220 to the one or more client devices 210, as well as to the one or more third party websites 230. The web server 340 serves web pages, as well as other web-related content, such as Java, Flash, XML and so forth. The web server 340 may provide the functionality of receiving and routing messages between the social networking system 100 and the client device 210, for example, instant messages, queued messages (e.g., email), text and SMS (short message service) messages, or messages sent using any other suitable messaging technique. A user may send a request to the web server 340 to upload information, for example, images or videos that are stored in the content store 310. Additionally, the web server 340 may provide API functionality to send data directly to native client device operating systems, such as iOS®, ANDROID™, webOS® or RIM.

The content selector 170 identifies content items from the content store 310 for presentation to social networking system users based on keywords associated with content items and information stored in user profiles. In one embodiment, the content selector 170 selects content posted to a brand page that is delivered to a user by determining whether the user has a characteristic specified by a keyword. For example, the content selector 170 compares an interest identified by a user profile with targeting criteria associated with the content. Alternatively, the content selector 170 selects content posted to a brand page for presentation to the user based on the user's affinity for keywords associated with the content.

In one embodiment, the content selector 170 communicates with the content store 310, the user profile store 305 and/or the action log 320 to identify content from a brand page for delivery to a social networking system user responsive to the user having information in a user profile matching, or otherwise associated with, a keyword associated with the content. As an example, the content selector 170 identifies one or more interests of a user connected to a brand page from a user profile associated with the user. In some embodiments, the content selector 170 may identify a user's interests based on interactions between the user and the brand page retrieved from the action log 320; this allows the content selector 170 to used brand-page specific interactions to ascertain a user's interest. The content selector 170 may communicate with the user profile store 305 to modify the user's profile to include an interest identified by the content selector 170 from user interaction with the brand page. For example, interactions between the user and content on the brand page associated with a keyword, or including a keyword, may cause the content selector 170 to determine that the user has an interest in the keyword and update the user profile store 305 accordingly.

Upon determining the user's interests, the content selector 170 determines whether one or more of the interests match one or more keywords associated with content items posted to the brand page. Content items associated with keywords, such as targeting criteria, which match the user's interests are then delivered to the user by the content selector 170. Hence, the content selector 170 uses data from the user profile stores 305 and/or from the action log 320 to determine whether a user connected to a brand page has at least one characteristic specified by keywords associated with content posted to the brand page. For example, content associated with a keyword specifying an action, a location, an event, an interest, a connection or any other suitable characteristic that is matched by a characteristic of a user is selected for presentation to the user. This allows customization of content delivered from the brand page to connected users to users based on characteristics of the users. Examples of content delivered to the user include promotional information provided by the entity describing products and services, product reviews, images or posts from other users describing interaction with the entity or other social objects describing the entity and/or products or services offered by the entity.

In other embodiments, the content selector 170 communicates with the edge store 330 to determine a user's affinities for keywords associated with content posted to the brand page. The content selector 170 identifies content items posted to the brand page associated with keywords for which the user has the highest affinities or for which the user has at least a threshold affinity. To personalize the user's interaction with the brand page, the content items content posted to the brand page presented to the user, content items selected based on the user's affinities are presented to the user through the brand page, news feed stories, e-mails, text messages, or using any other suitable communication channel. Presenting content items posted to the brand page based on the user's affinities for the brand page increases the likelihood that the user will be interested in viewing the presented content items, increasing the likelihood of additional user interactions with the brand page.

The display generator 335 determines when a user of the social networking system 100 has requested that information be displayed and, in cooperation with the content selector 170, displays content customized to the user requesting the content. For example, a user may navigate to a brand page within the social networking system 100, and the display generator 335 modifies appearance of the brand page based on data from the content selector 170. In one embodiment, the display generator 335 retrieves content identified by the content selector 170 from the content store 310 and displays the retrieved content to provide the user with a page experience customized based on the user's profile or interests. For example, content items displayed when a user views the brand page are modified so that content items associated with keywords that the user matches or associated with keywords in which the user has a threshold affinity are more prominently displayed. The display generator 335 may provide a webpage or some other suitable display format to present content to the user via a client device 210. The display generator 355 may notify the content item selector 170 when the display has been generated in response to a request from the user.

Selection of Content Items to Provide to Social Networking System Users

Figure 4:
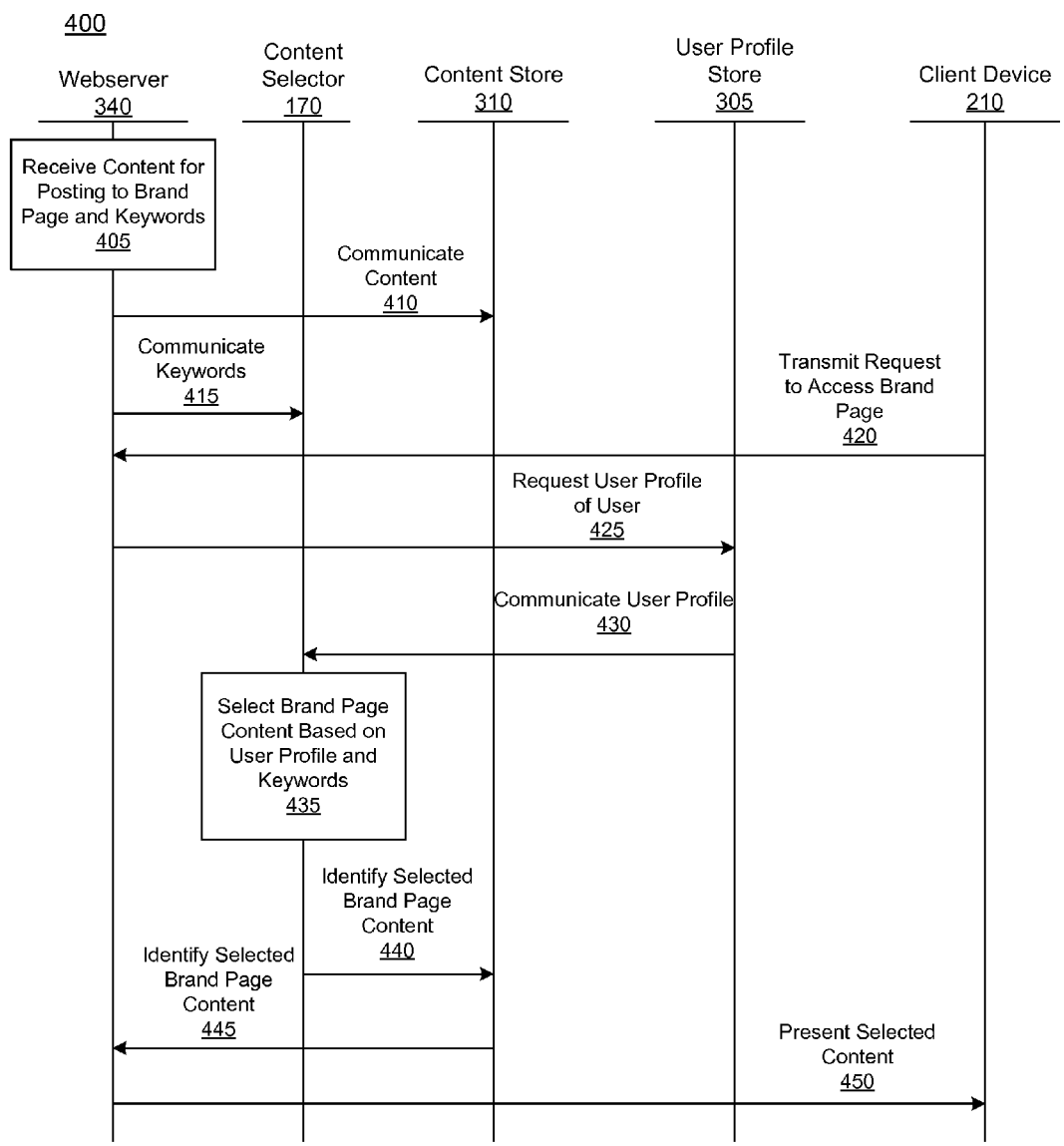
FIG. 4 is an interaction diagram of a process for selecting content items for display, in accordance with an embodiment of the invention.

FIG. 4 illustrates an interaction diagram of a method 400 for selecting content associated with a brand page for presentation to a social networking system user. In one embodiment, the social networking system 100 receives 405 content for posting to a brand page via the web server 340. For example, the social networking system 100 receives articles, ads, videos, audio files or other content from an entity for posting to the brand page. In addition to the content, the web server 340 receives 405 one or more keywords associated with the content. The keywords describe the content and/or describe one or more characteristics of a social networking system user to whom the content is to be presented. The content received by the web server 340 is communicated 410 to the content store 310, where it is stored. In one embodiment, the received keywords are communicated 415 to the content selector 170. Alternatively, the keywords may be communicated to the content store 310, and the content selector 170 subsequently retrieves the keywords from the content store 310.

To access the brand page, or to access content associated with the brand page, a social networking system user transmits 420 a request to access the brand page from a client device 210 to the web server 340 of the social networking system 100. The request includes an identifier of the social networking system user, which the web server 340 uses to request 425 the user profile associated with the social networking system user from the user profile store 305. After being identified, the user profile is communicated 430 from the user profile store 305 to the content selector 170. Additional information associated with the user, such as actions from the action log 320 and/or edges from the edge store 330 may be communicated to the content selector 170.

Based on the keywords associated with the content posted to the brand page and information from the user profile, the content selector 170 selects 435 content posted to the brand page for presentation to the user. The keywords may identify criteria such as interests, actions, locations, connections, connection types, events, groups or other information and the content selector 170 compares information from the user profile or otherwise associated with the user to the keywords. Content posted to the brand page and associated with one or more keywords that match information in the user profile is selected 435 for presentation to the user.

Alternatively, the keywords identify characteristics of the content, allowing an entity providing the content to associate topics, products, events, brands, people, entities or other information with the content. The content selector 170 may retrieve, from the edge store 330, the user's affinities for one or more keywords associated with content posted to the brand page and uses the affinities to select 435 content posted to the brand page for presentation to the user. The user's affinity for a keyword provides an indication of the user's likelihood of being interested in content associated with the keyword; accordingly, selecting 435 content based on the user's affinities allows the content selector 170 to increase the likelihood of the user having an interest in the selected content. In one embodiment, the content selector 170 selects 435 content associated with keywords with which the user has at least a threshold affinity. Alternatively, the content selector 170 selects 435 content associated with keywords with which the user has the highest affinities relative to affinities for other keywords.

The content selector 170 identifies 440 the selected content posted to the content store 310. For example, the content selector 170 retrieves content corresponding to selected content identifiers from the content store 310. The selected content posted to the brand page is communicated 445 from the content store 310 to the web server 340, which presents 450 the selected content to the client device 210 associated with the users. Alternatively, the content selector 170 communicates content identifiers associated with the selected content posted to the brand page to the web server 340, which retrieves content corresponding to the content identifiers from the content store 310. The retrieved content is then presented 450 to the client device 210.

The selected content posted to the brand page may be presented 440 to the client device 210 in a variety of ways. For example, the selected content may be displayed to a user by customizing the content included on a representation of the brand page shown to the user accessing the brand page. The representation of the brand page may include the selected content and not other content associated with the brand page or the representation of the brand page may visually distinguish the selected content from other content associated with the brand page. This personalizes the content presented to the user via the brand page, increasing the likelihood that the user interacts with the brand page. Alternatively, one or more stories describing the selected content are sent to the user in a news feed. In another example, a message including selected content, or describing selected content item, is sent to a client device 210 associated with the user. The message may be transmitted using any suitable communication channel, such as via a text message, via an e-mail, via a social plug-in included on a web page in a domain external to the social networking system 100, via a push communication channel or any other suitable communication technique.

Figure 5:
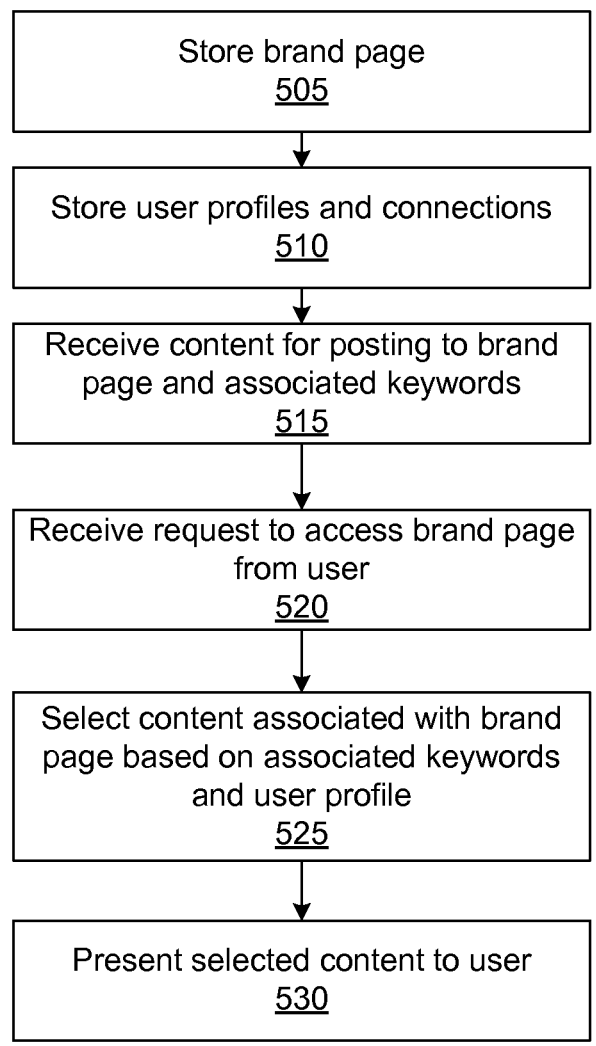
FIG. 5 is a flow chart of a process for selecting content items, in accordance with an embodiment of the invention.

FIG. 5 shows a flow chart of one embodiment of a method 500 for selecting content associated with a brand page for presentation to a social networking system user. A brand page associated with an entity is stored 505 by a social networking system 100. For example, the brand page is stored 505 in a content store 310 of the social networking system 100. The social networking system 100 also stores 510 user profiles for users of the social networking system as well as connections between the user profiles. One or more of the user profiles have a connection to the brand page. Content for posting to the brand page and keywords associated with the content is received 515. As described above, one or more keywords may be targeting criteria defining at least one characteristic of a social networking system user, such as an interest of a social networking system user. Other examples of targeting criteria include a social networking system user posting content about an entity-specified topic or product, indicating a preference for a product or post (i.e., "liking" the product or post), sending a post to another social networking system user or any other interaction with the brand page or with content on the brand page. One or more keywords may describe characteristics of content, such as topics, events, users, entities or other information about the content. Keywords may be specified by an entity associated with the brand page.

The social networking system 100 receives 520 a request to access the brand page from a user. For example, a user requests to view the brand page from a client device 210. The request includes an identifier of the social networking system user, is used to identify a user profile associated with the user that is maintained by the social networking system 100. After being identified, the user profile is communicated 430 from the user profile store 305 to the content selector 170. Additional information associated with the user, such as actions from the action log 320 and/or edges from the edge store 330 may be communicated to the content selector 170.

Based on the keywords associated with the content posted to the brand page and information from the user profile, content posted to the brand page is selected 525 for presentation to the user. As described above, keywords may identify criteria such as interests, actions, locations, connections, connection types, events, groups or other information. Accordingly, content associated with keywords matching information in the user profile, or other information associated with the user, is selected 435 for presentation to the user. Alternatively, keywords may identify characteristics of the content, allowing an entity providing the content to associate topics, products, events, brands, people, entities or other information with the content. Hence, the user's affinity for various keywords is determined, as further described above, and content is selected based on the user's affinity for one or more keywords associated with the content. For example, content associated with keywords with which the user has at least a threshold affinity is selected 525. Alternatively, content associated with keywords with which the user has the highest affinities relative to affinities for other keywords is selected 525. The selected content is presented 530 to the user as described above in conjunction with FIG. 4.

Figure 6A:
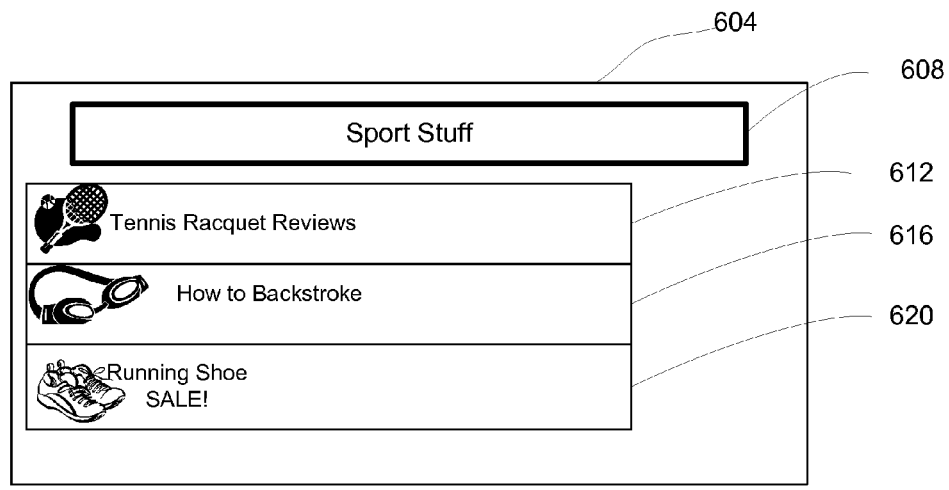
FIGS. 6A-6C are illustrations of page views in a social networking system that have been personalized, in accordance with an embodiment of the present disclosure.
Figure 6B:
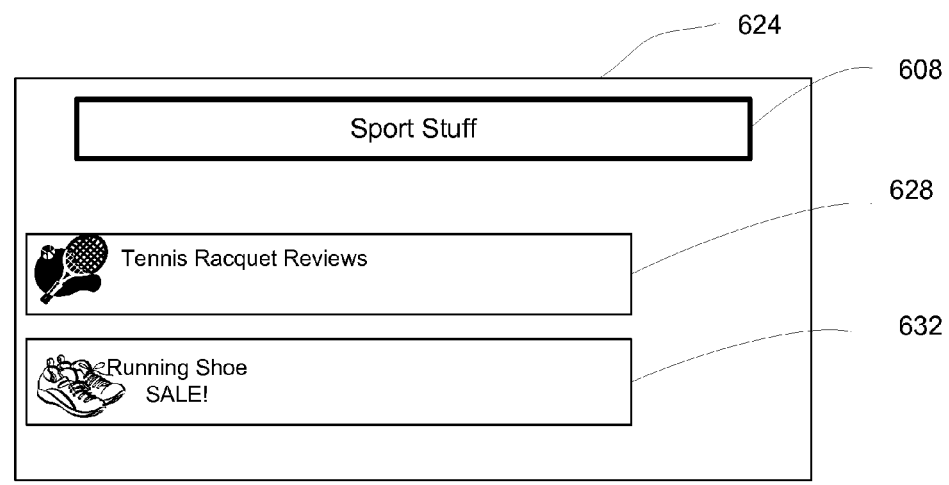
Figure 6C:
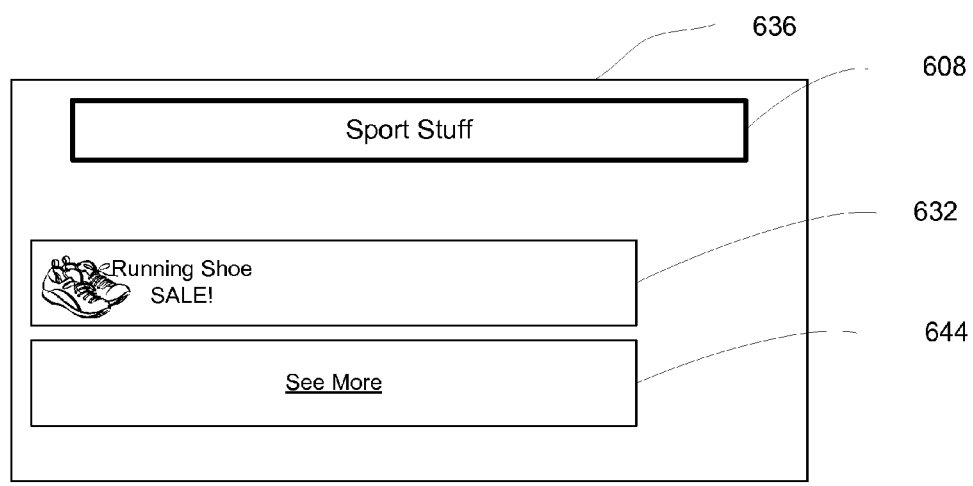

FIGS. 6A-C illustrate examples of modifying a brand page's appearance based on keywords associated with content posted to the brand page. FIG. 6A is an example of a conventionally displayed brand page 604. In one embodiment, the conventionally displayed brand page 604 includes an entity identifier 608, such as a name, logo, image, video or other information identifying the entity associated with the conventionally displayed brand page 604. The conventionally displayed brand page 604 includes multiple content items 612, 616, 620. Frequently, the multiple content items 612, 616, 620 provide a diverse range of information, with some of the content items 612, 262, 620 being of little value to a social networking system user viewing the brand page. In the example of FIG. 6A, the brand page 604 is associated with a sporting goods supplier and the content items 612, 616, 620 describe various products offered by the sporting goods supplier. For example, a content item 612 provides reviews of tennis racquets for sale by the sporting goods supplier. Another content item 616 provides instructions for swimming techniques while an additional content item 620 advertises a current sale on running shoes by the sporting goods supplier.

Although different social networking system users likely have varying degrees of interest in the various sports described by the content items 612, 616, 620, a conventionally displayed brand page 604 shows each content item 612, 616, 620 to each viewing user. This may require the user to sort through several content items 612, 616, 620 to find interesting content.

FIG. 6B illustrates a brand page 624 customized for a viewing user based on keywords associated with content items 628, 632. In FIG. 6B, the keywords associated with content items 628, 632 are targeting criteria and the brand page 624 is customized to more prominently display content items associated with targeting criteria that the viewing user satisfies. For example, if the viewing user's profile includes an interest in tennis, content item 628, which is associated with targeting criteria defining an interest in tennis, is more prominently displayed. For example, the brand page 624 displays content item 628 near the top of the brand page 624, allowing the viewing user to more easily find content item 628. Alternatively, the keyword associated with content item 628 may identify that content item 628 is related to tennis and the viewing user has at least a threshold affinity for tennis based on the user's user profile, so the brand page 624 is customized to visually distinguish content item 628 from other content items. In FIG. 6B, the brand page 624 also displays another content item 632 associated with targeting criteria the viewing user does not meet, but less prominently displays the other content item 632. For example, the other content item 632 is displayed lower on the brand page 624, is displayed with reduced information or is otherwise distinguished from the content item 628 associated with targeting criteria that the user satisfies. In other embodiments, the other content item 632 may be obscured or not displayed to reduce the quantity of information presented to the viewing user.

FIG. 6C illustrates an additional example brand page 636 customized for a viewing user based on keywords associated with content items. In FIG. 6B, the brand page 636 is customized to reduce the display of content items associated with keywords that are targeting criteria not satisfied by a viewing user or associated with keywords identifying characteristics for which the viewing user has less than a threshold affinity. For example, the brand page 636 displays a content item 632 associated with a targeting criteria specifying an interest in running when a viewing user's profile includes an interest in running To increase the viewing user's attention to the content item 632, the brand page displays an additional content message 644 rather than display content items associated with targeting criteria that the viewing user does not match or associated with keywords identifying characteristics in which the user has less than a threshold affinity. The viewing user may see the additional content items by accessing the additional content message 644.

In some embodiments, a user profile may include information describing how a brand page's display is customized. For example, a user profile includes preference information indicating whether to customize the brand page as shown in FIG. 6B, FIG. 6C or to customize the band page in another suitable manner. Thus, customizing appearance of a brand page allows the brand page to make content more accessible to different users based on user characteristics. This customized presentation of content may increase user interaction with the brand page, promoting a stronger relationship between a user and the entity associated with the brand page.

As described above, an owner or administrator of a brand page can post a variety of content items (such as posted text, a picture or picture album, a video, a deal, a coupon, an event or invitation thereto, etc.) to the social networking system. The social networking system then determines whether users of the social networking system who have established a connection to the brand page may be presented with certain ones of these posted content items. For example, the page owner or administrator may associated a posted content item with a targeting criteria, which is matched against a user's profile to determine whether the user may be presented with the content item. Alternatively, the system may predict an affinity that the user will have for a particular posted content item and then use that affinity to determine whether the user may be presented with the content item. U.S. patent application Ser. No. 12/978,265, filed Dec. 23, 2010, which is incorporated by reference in its entirety, describes various systems for predicting a user's affinity for content in a social networking system. By selectively providing users who have established a connection with a brand page with content items posted in connection with the brand page, the social networking system can personalize its users' experiences such that their associations with a brand page is more relevant to each user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
storing one or more user profiles of users of the social networking system and a set of connections among the users, each user profile including information corresponding to at least one user interest;
receiving, from the entity, one or more products for sale by an entity, the one or more products to be provided for presentation to users of the social networking system;
receiving, from the entity, a request to associate the one or more products with a page created by the entity in the social networking system;
in response to receiving the request from the entity, associating the one or more products with the page created by the entity in the social networking system, wherein the page includes an indication of the entity in the social networking system;
receiving, at the social networking system from a viewing user, a request to access the page associated with the entity in the social networking system, the viewing user associated with a corresponding user profile connected to the page;
in response to the request to access the page from the viewing user, determining, by the social networking system, an affinity of the viewing user for a keyword associated with a product from the one or more products based on the user profile of the viewing user;
in response to the determined affinity, selecting the product for presentation on the page; and
providing the page for presentation to the viewing user, the page including the selected product and having a customized appearance specific to the viewing user.

2. The method of claim 1, wherein the one or more products associated with the page in the social networking system include an additional product message for accessing one or more additional products.

3. The method of claim 1, wherein the one or more products associated with the page in the social networking system include information about the entity associated with the page.

4. The method of claim 1, wherein the one or more products associated with the page in the social networking system are associated with one or more keywords describing the one or more products, the one or more keywords defined by the entity.

5. The method of claim 4, wherein selecting, by the social networking system, the product from the one or more products is further based on the one or more keywords associated with the product.

6. The method of claim 5, wherein at least one keyword of the one or more keywords describing a product comprises targeting criteria defining one or more characteristics of a user of the social networking system eligible to be presented with the product.

7. The method of claim 6, wherein the targeting criteria are selected from a group consisting of: an interest, a location, an event type, a type of connection, an additional user, an action, an employer, an educational institution, the affinity between at least one user interest and the product, or any combination thereof.

8. The method of claim 5, wherein at least one keyword of the one or more keywords associated with a product of the one or more products comprises a characteristic describing the product.

9. The method of claim 1, wherein selecting, by the social networking system, the product from the one or more products is further based on the information corresponding to the user interest in the user profile associated with the viewing user.

10. The method of claim 1, wherein providing the selected product for presentation on the page such that the page has a customized appearance specific to the viewing user comprises displaying the selected product to visually distinguish the selected product from additional products.

11. A computer program product comprising a non-transitory computer-readable storage medium containing computer program code for:
storing one or more user profiles of users of the social networking system and a set of connections among the users, each user profile including information corresponding to at least one user interest;
receiving, from the entity, one or more products for sale by an entity, the one or more products to be provided for presentation to users of the social networking system;
receiving, from the entity, a request to associate the one or more products with a page created by the entity in the social networking system;
in response to receiving the request from the entity, associating the one or more products with the page created by the entity in the social networking system, wherein the page includes an indication of the entity in the social networking system;
receiving, at the social networking system from a viewing user, a request to access the page associated with the entity in the social networking system, the viewing user associated with a corresponding user profile connected to the page;
in response to the request to access the page from the viewing user, determining, by the social networking system, an affinity of the viewing user for a keyword associated with a product from the one or more products based on the user profile of the viewing user;
in response to the determined affinity, selecting the product for presentation on the page; and
providing the page for presentation to the viewing user, the page including the selected product and having a customized appearance specific to the viewing user.

12. The computer program product of claim 11, wherein the one or more products associated with the page in the social networking system include an additional product message for accessing one or more additional products.

13. The computer program product of claim 11, wherein the one or more products associated with the page in the social networking system include information about the entity associated with the page.

14. The computer program product of claim 11, wherein the one or more products associated with the page in the social networking system are associated with one or more keywords describing the one or more products, the one or more keywords defined by the entity.

15. The computer program product of claim 14, wherein the computer program code for selecting, by the social networking system, the product from the one or more products is further based on the one or more keywords associated with the product.

16. The computer program product of claim 15, wherein at least one keyword of the one or more keywords describing a product comprises targeting criteria defining one or more characteristics of a user of the social networking system eligible to be presented with the product.

17. The computer program product of claim 16, wherein the targeting criteria are selected from a group consisting of:

an interest, a location, an event type, a type of connection, an additional user, an action, an employer, an educational institution, the affinity between at least one user interest and the product, or any combination thereof.

18. The computer program product of claim 15, wherein at least one keyword of the one or more keywords associated with a product of the one or more products comprises a characteristic describing the product.

19. The computer program product of claim 11, wherein the computer program code for selecting, by the social networking system, the product from the one or more products is further based on the information corresponding to the user interest in the user profile associated with the viewing user.

20. The computer program product of claim 11, wherein the computer program code for providing the selected product for presentation on the page such that the page has a customized appearance specific to the viewing user comprises computer program code for displaying the selected product to visually distinguish the selected product from additional products.

* * * * *